Patented Apr. 23, 1940

2,198,222

UNITED STATES PATENT OFFICE 2,198,222

CACAO BUTTER AS ANTIOXIDANT

Sidney Musher, New York, N. Y., assignor to Musher Foundation Incorporated, New York, N. Y., a corporation of New York No Drawing. Application November 9, 1935, Serial No. 49,101

6 Claims. (Cl. 99—163)

This invention relates to the protection of glyceride oils and fats and blends thereof against rancidity and oxidation.

This invention is accordingly concerned with a method for the protection of glyceride oils and fats against rancidity and oxidation by the use of cacao butter.

Still further objects and advantages of the present invention will appear from the more detailed description set forth below, it being understood, however, that this more detailed description is given by way of limitation, since various changes therein may be made by those skilled in the art without departing from the scope and spirit of the present invention.

In the customary practice for the manufacture of cacao butter the cacao nibs after cleaning to remove foreign substances are subjected to a roasting process for from 30 to 50 minutes in revolving ovens at a temperature of approximately 135° C. whereupon they are removed and cooled. The thin outer shell is then removed, producing broken decorticated kernels called nibs. The nibs are then ground in a milling machine, during which time the cacao butter is liquefied by the frictional heat generated by this grinding operation, resulting in a free flowing liquor. This cacao liquor is then compressed in hydraulic presses which remove the cacao butter therefrom.

It is the cacao butter produced in this manner that has the property of inhibiting rancidity of glyceride oils and fats since the non-fatty solids of the cacao nibs have by this process been transferred into the cacao butter so produced.

It has been found, for instance, that 2% of this cacao butter added to lard will give the following effectiveness as an antioxidant, the test being conducted by bubbling air through a small quantity of oil at 208° F. and determining rancidity both organoleptically and also by the oxygen absorption of the fat:

| | Hours |
|---|---|
| Control bleached lard | 1 |
| Bleached lard containing 2% cacao butter | 3½ |
| Control prime steam lard | 7 |
| Prime steam lard containing 2% cacao butter | 14 |

The proportion of cacao butter to use will depend entirely upon the degree of protection desired. 5% of cacao butter added to bleached lard will, for instance give much greater protective action than will 2%, etc.

It must be understood in all cases that the protection afforded by this treatment with cacao butter is not at all due to the relative keeping quality of cacao butter itself. It is generally well understood that when a blend of two fats is made, the keeping quality of the combined blend is determined by the keeping quality of the poorest oil used. This is particularly the case when a large percentage of the poorer grade oil is present. In other words, the usual compound shortening which comprises approximately 85% of liquid oil and 15% of fully hydrogenated shortening has a keeping quality based upon that of the liquid oil present in that blend. For this reason a partially hydrogenated shortening which has been 100% hydrogenated has much longer keeping qualities than any blend of fully hydrogenated shortening and liquid oil commonly referred to as compound shortening.

It has similarly been found that cacao butter can be used for treatment of or admixture with any type of glyceride oil or fat including cottonseed oil, corn oil, peanut oil, sesame oil, cocoanut palm kernel oil, castor oil, cod liver oil, tallow, beef fat, mutton fat, etc.

In order to give an idea of the protection afforded by cacao butter the following table will indicate this activity:

| | Hours |
|---|---|
| Control deodorized soya bean oil | 8 |
| Soya bean oil containing 5% cacao butter | 17 |
| Control deodorized cottonseed oil | 18 |
| Cottonseed oil containing 2% butter | 26 |
| Control castol oil | 3 |
| Castor oil containing 1% cacao butter | 5½ |

From these and from numerous other tests, the protective action afforded by the use of cacao butter blended with these fats may be observed.

Cacao butter is particularly desirable antioxidant to use in lard for it is an accepted edible fat. In addition, it is relatively a simple matter to blend the cacao butter with such glyceride fat or oil and in particular with lard or tallow to be protected from rancidity with no additional equipment or added manipulation required for the operation.

This invention is to cover not only the use as an antioxidant of such cacao butter as is manufactured by the normal processes of grinding and subsequently expressing that cacao butter by means of which the cacao butter would be infused with the non-fatty solids of the cacao bean, but is in addition intended to cover the cacao butter produced by direct expression from the cacao bean without any previous grinding of the cacao butter in the non-fatty solids as more particularly described in my copending application Serial 36,750, filed August 17, 1935, on cacao bean products. The cacao butter seems to have an inherent antioxygenic activity regardless of the method of expression from the cacao bean although, of course, by reason of its infusion in the non-fatty solids by the usual processes greater activity as an antioxidant is given to it.

Having now described my invention, what I claim is:

1. A composition comprising a glyceride oil normally subject to oxidation and a small amount of a cacao butter product capable of resisting oxidation in said oil dispersed throughout the body thereof.

2. An oxidation resisting composition containing a material selected from the group of glyceride oils and fats subject to oxidative change, and an amount of cacao butter sufficient to act as an antioxidant, but not exceeding about 5% based on the glyceride in the composition dispersed throughout the body thereof.

3. A composition consisting of lard and a minor amount of cacao butter as an antioxidant.

4. A process of stabilizing organic products normally subject to oxidative deterioration containing cottonseed oil against oxidative deterioration which comprises dispersing therein a small percentage of cacao butter thereto in an amount not exceeding about 5%.

5. A process of stabilizing glyceride oil containing compositions normally subject to oxidative deterioration against oxidative deterioration which comprises dispersing therein a small percentage of cacao butter in an amount not exceeding about 5%.

6. A shortening composition comprising a fatty material and a minor amount of cacao butter as a stabilizer.

SIDNEY MUSHER.